United States Patent Office 2,701,245
Patented Feb. 1, 1955

2,701,245

BEAD POLYMERIZATION OF METHYL METHACRYLATE

William Lynn, Rochester, N. Y., assignor to Eastman Kodak Company, Rochester, N. Y., a corporation of New Jersey No Drawing. Application May 1, 1951,
Serial No. 224,075

4 Claims. (Cl. 260—89.5).

This invention relates to a method of forming small beads or spheres of thermoplastic materials and more particularly to a novel bead polymerization method by which extremely small polymeric beads which do not tend to agglomerate during polymerization may be produced.

Bead polymerization, per se, is well known to the prior art and it is emphasized that the instant invention is directed to the production of small spherical polymeric beads which do not stick together and which have not been produced by prior art methods.

The methods heretofore employed generally involve selecting a polymerizable monomer and a polymerization catalyst and continuously agitating them in the presence of water and wetting agent until polymerization is substantially complete. It has previously been considered necessary when polymerizing a monomer to produce beads, to maintain continuous agitation during the entire reaction time. The mechanics of the reaction are considered to be as follows: Monomer droplets form, combine and break apart during continuous agitation and it was believed that agitation was particularly necessary during the time when polymerization was actually taking place, in order that coalescence of the droplets of partly polymerized monomer be minimized, since in the soft condition they do not readily break apart on continued agitation.

A procedure for polymerizing methyl methacrylate in the form of very small beads, in the size range of a few microns, by using wetting agents to obtain small bead size, and employing continuous agitation in conventional manner, is unsatisfactory in that the beads are not obtained as individual particles, but as clumps of beads, tightly adhering together.

The polymeric bead-producing method of the present invention has several advantages over prior art methods. For instance, the beads as formed are not stuck together and do not need to be ground to break down clumps into individual beads. Furthermore, the beads formed by my invention are more spherical. This is no doubt because the beads were never temporarily stuck to other beads. Spherical beads are desirable in connection with forming optical elements where uniformity of bead surface is required. The elimination of the grinding step which is necessary in the prior art methods is a great advantage from a production standpoint, because grinding requires considerable labor and also entails considerable loss of product since grinding must not be carried as far as to fracture or abrade an appreciable portion of the beads. This means that a considerable portion of the clumps are not completely ground and unwanted agglomerates of beads containing from two to thousands of beads are present in the product and must be separated therefrom. My improved method avoids such disadvantageous operations and products and moreover permits the production with certain monomers of individual spherical beads which are of considerably smaller diameter than can be produced by the old methods.

An object, therefore, of the present invention is to provide a method of forming polymeric beads of a diameter in the range of 1 to 20 microns.

Another object of the invention is to provide a method of forming polymeric beads of methyl methacrylate, vinyl pyridine, or styrene under conditions which prevent substantial agglomeration of the individual beads. Still another object of the invention is to provide a method for forming very small polymeric beads which are all substantially spherical in shape.

Other objects will appear hereinafter.

In accordance with my invention these and other objects are attained by employing a novel agitation and polymerization schedule for the reaction mixture containing the monomer and polymerization catalyst, and, in addition, by employing selected wetting agents. More specifically I have found, contrary to the theories of the prior art which require continuous agitation during polymerization, that beads of a size of 1 to 20 microns which do not adhere to one another can be produced by vigorously agitating the reaction mixture containing the monomer, catalyst, wetting agent and nonsolvent liquid before substantial polymerization can take place and then permitting polymerization to take place while the reaction mixture stands quietly without agitation. This novel departure from the prior art practice appears to be the basis of my invention and causes the formation of the small discrete beads. Concentration of reactants, selection of particular wetting agents and reaction temperature and agitation variations also can be correlated to vary the bead sizes within a desired diameter range.

My process can be employed for the production of small beads in the size range of about 1 to 20 microns of methyl methacrylate, styrene, copolymers of these, and copolymers of methyl methacrylate with bifunctional monomers such as divinyl styrene or diethylene glycol diallyl dicarbonate.

These and other features of the invention are described more fully in the following description and examples.

Example 1

In a 5-gallon Pyrex bottle are placed: (1) a solution of 47 g. of benzoyl peroxide and 23.6 g. of dioctyl ester of sodium sulfosuccinic acid (available under the name of Aerosol OT 100%) in 9.75 pounds of commercial monomeric methyl methacrylate which is stabilized with a small quantity (about 0.005%) of hydroquinone; and (2) a solution of 94.6 g. of a 25% aqueous solution of sodium N-oleyl-N-methyl taurate (available under the name of Artic Syntex T gel) in 20.45 pounds of warm tap water (about 50° C.). The bottle is suspended in a water bath maintained at 50° C. and while loosely covered, stirred for one hour with a 2-inch, 3-bladed stainless steel propeller turning at 1750 R. P. M. The stirrer is then removed and the bottle loosely covered and allowed to remain in the bath for approximately 24 hours. The droplets which are formed tend to rise very slowly so that after 3 to 4 hours, the liquid in the bottom of the bottle is nearly clear. Most of the polymerization takes place after approximately 6 hours. At this time the density of the droplets becomes greater than 1, and they begin to sink slowly. After one day at 50°, the beads have substantially all settled in the bottom third of the mixture, the upper two-thirds being a milky liquid containing some colloidal polymethyl methacrylate and most of the wetting agents. This amounts to about 3 per cent by weight of the aqueous layer. This can be removed by siphoning and the beads remaining in the bottle can be further washed by decantation, if desired, to remove additional colloidal material.

Examination under a microscope of beads prepared by this method shows that the diameter ranges from about 2 to 15 microns, with most of them (by weight) having diameters from about 6 to 12 microns. The beads did not adhere together and consequently a high yield of usable beads resulted. No grinding was required since no clumps of beads were present.

For comparison, the same ingredients, stirrer, temperature, and container were used, but with continued stirring. After 56 hours stirring little or no polymerization had taken place. The stirrer was then removed and the material left at 50°. After standing quietly for 16 hours polymerization had taken place. After an additional 48 hours at 50° C. the mixture was stirred up and the material examined. The product was individual beads, not clumped, ranging from 1 to 5 microns diameter; mostly about 2 microns. This shows that greatly prolonged stirring reduces the size of the beads.

The above polymerization was inhibited by excessive contact with air; therefore, a second comparison was made in which the same ingredients, stirrer, temperature and container were used, but in which the air present in the bottle was replaced by nitrogen. The bottle was loosely covered by aluminum foil, and a stream of nitrogen was maintained throughout the experiment to prevent contact with air. Stirring was continued throughout the polymerization. After 5.5 hours polymerization began, as evidenced by rise in temperature and the appearance of solid. This solid built up rapidly. After 6.2 hours a maximum internal temperature of 80° C. was attained, and the solid was a porous mass occupying appreciably more space than the original volume of reactance. After seven hours the polymerization was substantially ended, and the temperature was 73°. Stirring was stopped, and the reaction mixture was left at 50° C. After an additional seventeen hours the product was unchanged in appearance. It could be broken up, and was found to be a moderately firm agglomeration of clumps of small beads. These clumps were granular, in the size range of about 0.1 mm. Some of these were ground in a mortar. The beads were from 1 to 12 microns diameter, mostly from 4 to 10 microns, that is, similar in size to those obtained using the one-hour stir. The beads were in some cases, however, not perfectly spherical.

Example 2

Into each of two 2.5 gallon bottles was placed one-half the above amounts of ingredients. These bottles were stoppered and tumbled end over end for 6 hours at 17 R. P. M. in a water bath at 50° C. They were then allowed to stand for 3 days at 50° without agitation. The product was, in general, similar to that described in Example 1.

Other modifications were made by using proportionate amounts of the same materials of Example 1 in one-quart fruit jars, stirring with a single 3-bladed propeller of one-inch diameter at 1750 R. P. M. with similar products resulting.

To illustrate the advantageous features of my invention of agitating without polymerization followed by polymerization in a quiescent state, the agitation of similar materials, as in Example 2, was continued for 21 hours, and polymerization during agitation was permitted to take place. As the result of this variance of operation, the product consisted mainly of cinderlike clumps of beads, mostly from 1/8 inch to 2 inches in diameter. These required grinding, for example, two hours in a ball mill, to break up most of the clumps. This clearly demonstrates the effectiveness of my method in the production of micron sized beads.

Example 3

Into a 1-quart fruit jar were placed 400 cc. of water in which had been dissolved 1 gram of dioctyl ester of sodium sulfosuccinic acid and 4 grams of a 25% aqueous solution of sodium N-oleyl-N-methyl taurate, 200 cc. of methyl methacrylate containing 5% divinyl benzene, and 2.0 g. of benzoyl peroxide. The mixture was placed in a 50° C. water bath and stirred as in the paragraph above, then allowed to polymerize at 50° without agitation. The product was beads similar in size to those of Example 1, but differed in that they were insoluble in acetone or other organic solvents.

In similar examples, other amounts of divinyl benzene were used, with similar results. Diethylene glycol diallyl dicarbonate was similarly used in various amounts with methyl methacrylate, and also gave insoluble beads of approximately the same size.

Example 4

The procedure of Example 3 was repeated except that the polymerizable monomer was a mixture of 150 cc. of methyl methacrylate and 50 cc. of styrene. The resulting copolymer was isolated as beads, approximately the size of those of Example 1.

Similar results were obtained using 100 cc. of methyl methacrylate and 100 cc. of styrene, or using 200 cc. of styrene.

These copolymers and polystyrene beads, of course, differ from polymethyl methacrylate beads in refractive index and density.

Example 5

To assure the formation of beads within the diameter range of 1 to 3 microns one may employ considerably more than the usual amount of wetting agent. To produce polymethyl methacrylate beads within the 1 to 3 micron range, I prefer to employ dioctyl ester of sodium sulfosuccinic acid. This increased amount of wetting agent gives smaller beads and also causes considerable loss due to colloidal material which is valueless and must be mostly separated from the beads before they can be employed. I have determined that lauroyl peroxide gives less loss as colloidal material when employing large amounts of wetting agent than does benzoyl peroxide when forming polymethyl methacrylate beads, and I prefer to use lauroyl peroxide as the polymerization catalyst when such extremely small beads are to be made. The following formula was employed to illustrate this discovery:

| | |
|---|---|
| Methyl methacrylate_____pounds__ | 6 |
| Dioctyl ester of sodium sulfosuccinic acid__grams__ | 191 |
| Peroxide [1]_____do____ | 28.7 |
| Water _____pounds__ | 25.25 |

[1] One sample contained benzoyl peroxide and the check sample contained lauroyl peroxide.

After stirring the samples from one hour in 5-gallon Pyrex bottles at 50° C., the mixtures were left at 50° C. for 3 to 4 days and then for 5 days at room temperature. The aqueous layer was separated by siphoning. The slurry of beads remaining after siphoning was stirred with a little water, and the amount of beads and colloidal and dissolved material was determined by evaporating down a portion of the slurry at 110° C. for total solids, and centrifuging a portion and evaporating down the aqueous layer as a measure of colloidal and dissolved material present. From these two figures, and the weight of the slurry, the amount of beads and colloidal and the yield based on the amount of polymethyl methacrylate employed were calculated. The results are shown in the following table:

| Peroxide | Approx. bead size | Slurry (Product) | | | Percent Yield | |
|---|---|---|---|---|---|---|
| | | Pounds | Percent Solid | Percent Beads | Percent Coll. | |
| | | | | | | Solid | Beads |
| Benzoyl____ | 2 | 8 lbs., 8 oz. | 38.1 | 33.5 | 4.62 | 54.0 | 47.5 |
| Lauroyl____ | 2 | 10 lbs., 3 oz. | 43.6 | 41.75 | 3.27 | 74.0 | 70.8 |

I have found that the temperature is not critical, except that it should be sufficiently high that polymerization takes place readily, and not so high as to cause boiling. There is considerable heat evolved during polymerization. For example, in one run similar to Example 1 but using twice as much benzoyl peroxide and starting the reaction at 32° C., a temperature of nearly 60° C. was reached during the height of the polymerization. No water bath was used in this case.

Stirring of the polymerization mixture is preferred to tumbling, principally as a matter of convenience, although shaking or using a homogenizer is also satisfactory.

The time of agitation is also not too critical. It should be long enough to obtain a complete mingling of the two phases, and should be stopped before substantial polymerization begins. In one series of operations no significant difference was found among samples which were tumbled for periods from one to six hours. In another series, shorter times of stirring, as 5 minutes or 20 minutes, gave results not greatly different from one hour. Intermittent stirring was also satisfactory, when confined to the time before polymerization. Also, it seems to make relatively little difference as to the number and size of propellers used. For example, in a 5-gallon bottle a 1.5 inch propeller or two 2-inch propellers gave bead sizes which differed only slightly from those obtained in Example 1.

Other ratios of water to monomer may be used, but the preferred ratio is from about five to two parts of water to one part of monomer. When much more water is used, there is greater loss from the formation of colloidal material, and when much less water is used, the temperature rise may be so great as to cause boiling.

The size of the particles is affected to some degree by the above variables, but the principal control of bead size within the 1 to 20 micron range is obtained by selection of the wetting agent and the amount used. In contrast to prior art methods the present invention permits the use of a wide variety of types of wetting agents. These, however, all fall within the general type of water-soluble, wetting agents. Among those successfully used are the following:

N-oleyl-N-methyl taurine sodium salt
Dioctyl ester of sodium sulfosuccinic acid
Sodium lauryl sulfate
2-ethyl-2-methylundecanol-4-sulfate, sodium salt
N-lauroyl-N-methyl taurine, sodium salt
N-octadecyl tetrasodium (1,2-dicarboxyl ethyl sulfosuccinamate)

Various mixtures of wetting agents have also been successfully used, including nonionic materials such as diglycerol monolaurate and lauryl ether of polyethylene glycol. In general, their behavior was similar.

Cation-active agents, as cetyl trimethyl ammonium chloride and others of this type also gave similar beads.

The presence of small amounts of salts also affects the bead size to some extent, but none have been found which are of great benefit in making beads of uniform size. Tap water or distilled water can be used.

Varying amounts of catalyst can be used, but this has only a minor effect on bead size. Benzoyl peroxide at one per cent concentration based on the monomer is suitable at 50° C. or 2 per cent at 30° C. Use of 0.1 and 0.05 per cent made the polymerization slower but did not greatly affect bead size. Other catalysts such as tetralin peroxide, cumene hydroperoxide, tertiary butyl hydroperoxide, methyl ethyl ketone peroxide, hydrogen peroxide, and N(α-azo-bis-isobutyronitrile) have been employed to catalyze the reaction in accordance with my invention.

What I claim and desire to secure by Letters Patent of the United States is:

1. A method of forming discrete polymeric spherical beads of 1 to 20 microns in diameter from water insoluble monomeric methyl methacrylate which comprises vigorously agitating the monomer in water in the presence of a dioctyl ester of sodium sulfosuccinic acid and a polymerization catalyst to produce a nonpolymerized mixture from which such poymeric beads can be formed, stopping the agitation before any substantial polymerization takes place, and permitting polymerization to occur while the mixture remains quiescent whereby such discrete polymeric spherical beads are formed.

2. A method of forming discrete polymeric spherical beads of 1 to 20 microns in diameter from water insoluble monomeric methyl methacrylate which comprises vigorously agitating the monomer in water in the presence of a dioctyl ester of sodium sulfosuccinic acid and a polymerization catalyst selected from the group consisting of benzoyl and lauroyl peroxides to produce a nonpolymerized mixture from which such polymeric beads can be formed, stopping the agitation before any substantial polymerization takes place, and permitting polymerization to occur while the mixture remains quiescent whereby such discrete polymeric spherical beads are formed.

3. A method of forming discrete polymeric spherical beads of 1 to 20 microns in diameter from water insoluble monomeric methyl methacrylate which comprises vigorously agitating a mixture of 1 part of monomeric methyl methacrylate containing approximately 1% lauroyl peroxide with approximately 4 parts of water containing from 1 to 2% dioctyl ester of sodium sulfosuccinic acid to produce a non-polymerized mixture from which such polymeric beads can be formed, stopping the agitation before any substantial polymerization takes place, and permitting polymerization to occur while the mixture remains quiescent whereby such discrete polymeric spherical beads are formed.

4. A method of forming discrete polymeric spherical beads of 1 to 20 microns in diameter from water insoluble monomeric methyl methacrylate which comprises vigorously agitating a mixture of 1 part of monomeric methyl methacrylate containing approximately 1% benzoyl peroxide with approximately 4 parts of water containing from 1 to 2% dioctyl ester of sodium sulfosuccinic acid to produce a non-polymerized mixture from which such polymeric beads can be formed, stopping the agitation before any substantial polymerization takes place, and permitting polymerization to occur while the mixture remains quiescent whereby such discrete polymeric spherical beads are formed.

References Cited in the file of this patent

UNITED STATES PATENTS

| | | |
|---|---|---|
| 2,191,520 | Crawford | Feb. 27, 1940 |
| 2,326,326 | Breedis | Aug. 10, 1943 |
| 2,496,222 | Kolvoort et al. | Jan. 31, 1950 |
| 2,594,913 | Grim | Apr. 29, 1952 |